US011741443B2

(12) United States Patent
Mohiuddin et al.

(10) Patent No.: US 11,741,443 B2
(45) Date of Patent: *Aug. 29, 2023

(54) VALUE TRANSFER BETWEEN DISPARATE SYSTEMS

(71) Applicant: NCR Corporation, Atlanta, GA (US)

(72) Inventors: Mohammad Jamal Mohiuddin, Telangana (IN); Sanjay Menghani, Hyderabad (IN); Bhanu Prakash Singh, Barra Kanpur (IN)

(73) Assignee: NCR Corporation, Atlanta, GA (US)

( * ) Notice: Subject to any disclaimer, the term of this patent is extended or adjusted under 35 U.S.C. 154(b) by 871 days.

This patent is subject to a terminal disclaimer.

(21) Appl. No.: 16/453,046

(22) Filed: Jun. 26, 2019

(65) Prior Publication Data
US 2019/0313708 A1    Oct. 17, 2019
US 2023/0157377 A9    May 25, 2023

Related U.S. Application Data

(62) Division of application No. 15/078,332, filed on Mar. 23, 2016, now Pat. No. 10,482,434.

(51) Int. Cl.
G06Q 20/10   (2012.01)
A41C 3/12    (2006.01)
A41F 1/00    (2006.01)
A45C 13/10   (2006.01)
A41C 3/00    (2006.01)

(52) U.S. Cl.
CPC ............... *A41C 3/12* (2013.01); *A41F 1/006* (2013.01); *A45C 13/10* (2013.01); *G06Q 20/10* (2013.01); *A41C 3/0028* (2013.01); *A41C 3/0057* (2013.01)

(58) Field of Classification Search
None
See application file for complete search history.

(56) References Cited

U.S. PATENT DOCUMENTS

| 10,997,592 | B1 * | 5/2021 | Kurani | G06Q 20/3821 |
| 2013/0332337 | A1 * | 12/2013 | Tran | G06Q 40/03 705/38 |
| 2015/0095225 | A1 | 4/2015 | Appana et al. | |
| 2016/0162851 | A1 | 6/2016 | Korosec et al. | |
| 2017/0011390 | A1 * | 1/2017 | Hsieh | G06Q 20/36 |
| 2017/0046688 | A1 * | 2/2017 | Pande | G06Q 20/20 |

FOREIGN PATENT DOCUMENTS

WO    WO-2009114876 A2 *  9/2009  ............. G06Q 20/10

* cited by examiner

*Primary Examiner* — Bruce I Ebersman
*Assistant Examiner* — Matthew Cobb
(74) *Attorney, Agent, or Firm* — Schwegman Lundberg & Woessner, P.A.

(57) ABSTRACT

Various embodiments herein each include at least one of systems, methods, and software for value transfer between disparate systems. One such embodiment includes receiving a transfer request to transfer a value from a first account provider to an account maintained with a second account provider and including data identifying an individual or entity that initiated the transfer request. This method also includes identifying the second account provider based on data included in the transfer request and generating a request to transfer the value of the transfer request to the account in a format compatible with the second account provider. The method may then transmit the generated request to the second account provider.

11 Claims, 5 Drawing Sheets

VALUE TRANSFER BETWEEN DISPARATE SYSTEMS

BACKGROUND INFORMATION

Mobile wallets, accessed and utilized via smartphones, smart watches, tablets, other mobile devices, and web browsers are becoming more commonly used. § A single person may have accounts with more than one mobile wallet provider. Some such mobile wallets store value, such as currency value or point values, much like a bank account. Each of mobile wallet service provider generally maintains their respective mobile wallet services on unique, disparate platforms that are not able to communicate or transfer value with other mobile wallet service provider platforms.

SUMMARY

Various embodiments herein each include at least one of systems, methods, and software for value transfer between disparate systems. One such embodiment includes receiving a transfer request to transfer a value from a first account provider to an account maintained with a second account provider and including data identifying an individual or entity that initiated the transfer request. This method also includes identifying the second account provider based on data included in the transfer request and generating a request to transfer the value of the transfer request to the account in a format compatible with the second account provider. The method may then transmit the generated request to the second account provider.

Another method embodiment includes receiving a first transfer request from a mobile device app via a network. The transfer request may include data identifying a first account of a user of the mobile device app, a value to transfer from the first account, and an identifier of a second account maintained by another entity to which the value is to be transferred. This method further includes debiting the value from the first account and crediting the value to a settlement account. The method may then generate a second transfer request including data representative of the user, the value, and the identifier of the second account maintained by the another entity and transmit the second transfer request via a network to a transfer processing intermediary.

A further embodiment is in the form of a system including at least one network interface device, at least one processor, and at least one memory device. The memory stores instructions in the at least one memory device that are executable by the at least one processor to perform data processing activities. The data processing activities, in some embodiments, include receiving, via the at least one network interface device from a transfer intermediary, a transfer request including data identifying a value to be transferred, an account identifier, and an entity identifier of an entity from which the value to be transferred is to be received. The data processing activities further include crediting an account of the account identifier with the value and debiting a settlement account of the entity of the entity identifier in the amount of the value.

DETAILED DESCRIPTION

Figure 1:
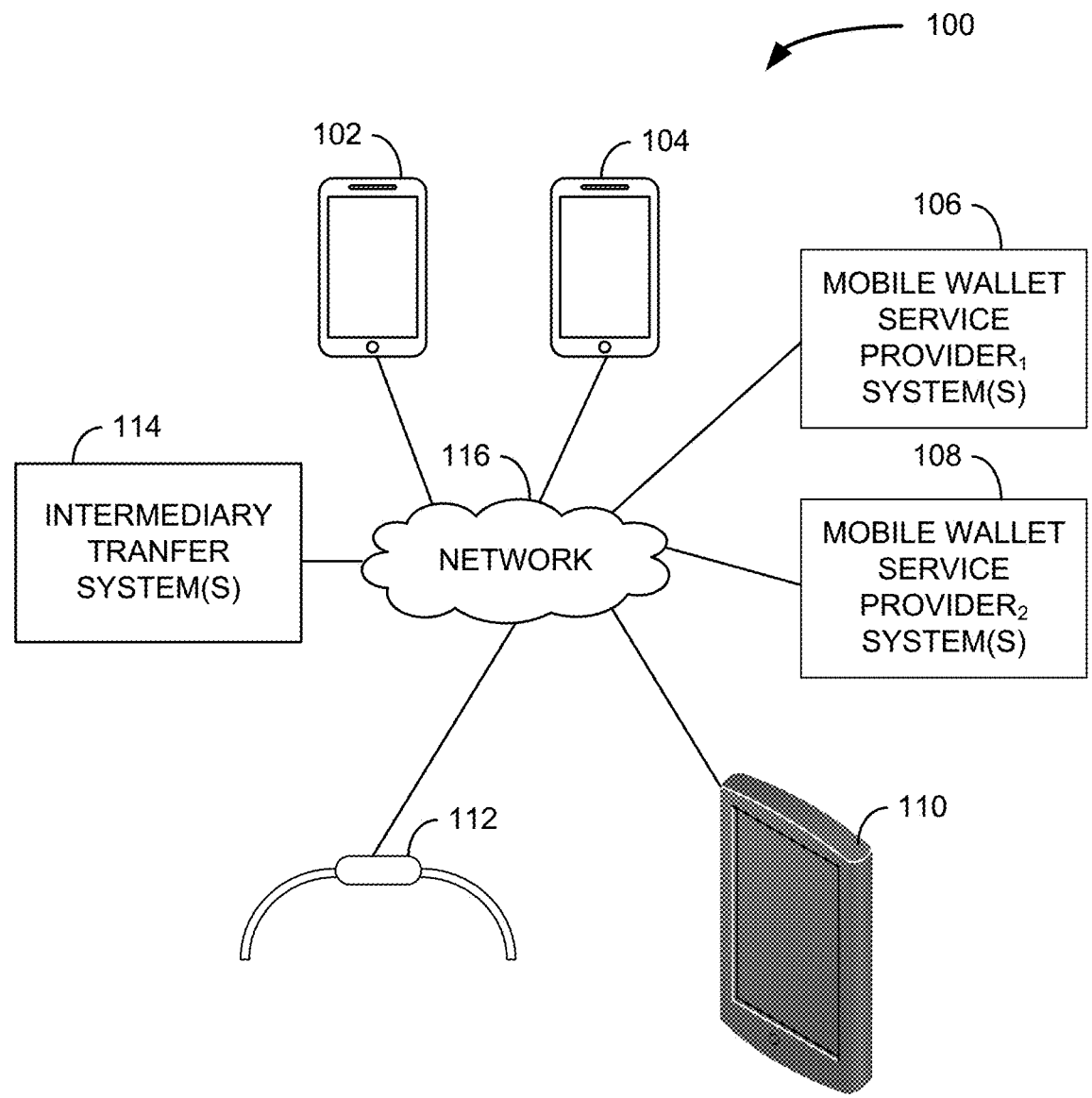
FIG. 1 is a logical block diagram of a system, according to an example embodiment.

Various embodiments herein each include at least one of systems, methods, and software for value transfer between disparate systems. Some such embodiments are implemented with regard to mobile wallet solutions that enable users to easily make payments via electronic mechanisms. Examples of such mobile wallet solutions include APPLE® PAY available from Apple Inc. of Cupertino, Calif., SAMSUNG® PAY available from Samsung Group of Seoul, South Korea, PAYTM available from One97 Communications Ltd. of Noida, India, and OXIGEN WALLET available from Oxigen Services (India) Pvt. Ltd., among others. These mobile wallet solutions enable users having accounts to make payments at payment tendering points, automated teller machines (ATMs), and, in some cases, via the Internet. Payments may be made, utilizing one or more of Near Field Communication (NFC) transponders, BLUETOOTH® transponders, and other wireless transponders of a mobile device authenticated with the user's mobile wallet service provider. In some of these solutions, payments may also or alternatively be made utilizing authentication data (i.e., username and password, phone number and personal Identification Number (PIN) or password, etc.) at a payment tendering point, on a website, in a mobile device app, and the like.

Regardless of the mechanism of tendering a payment or the actual mobile wallet solution an individual may be utilizing, an individual may have multiple mobile wallet accounts with multiple different mobile wallet service providers. Some mobile wallet solutions are prepaid where the account holder must put money on deposit with a mobile wallet service provider to enable the account holder to utilize the prepaid mobile wallet solutions. In such instances where an individual has an account with each of two mobile wallet service providers and one of those mobile wallet service provider accounts is a prepaid account, the individual may want to transfer value from one mobile wallet service provider to the prepaid account with the other mobile wallet service provider. Similarly, one user with a mobile wallet account may desire to make a transfer from their mobile wallet account to a mobile wallet account held by a different mobile wallet service provider of another person or entity, such as a business, a government office, or a non-profit organization. While payment solutions exist with mobile wallet service providers, these payment solutions require that each party to a payment transaction have an account with a single mobile wallet service provider. The various embodiments herein provide solutions to allow for value transfers between two accounts, where each account is maintained by a different mobile wallet service provider.

Some such embodiments include an intermediary transfer service that operates an intermediary transfer system. The intermediary transfer system in some such embodiments is adapted to leverage open interfaces accessible from each of the mobile wallet service providers. However, the open interface of each mobile wallet service provider is generally unique. Thus, the transfer intermediary system includes technical abilities to communicate with each mobile wallet service provider and to translate data between formats of the various mobile wallet service providers. However, in other embodiments, the intermediary transfer system(s) include an open interface that can be utilized by the mobile wallet service provider systems to communicate with other mobile wallet service providers, such as to transfer value to accounts maintained by other mobile wallet service providers.

In some embodiments, the transfer intermediary system operates only to communicate data of value transfers and to maintain settlement account balances between mobile wallet service providers. The settlement account balance is to be settled separately by the mobile wallet service providers via other means, such as interbank currency transfers, point balance transfers when the value transferred is in the form of loyalty points, airline miles, or other non-monetary value. In some embodiments, after two mobile wallet service providers are reconciled their settlement balances, one or both of the mobile wallet service providers may provide an update to that effect to the intermediary transfer system.

In some embodiments, at a very general level, a transfer of value may be initiated by a first user of a first mobile wallet service in a mobile device app. The first user may select an option within the mobile device app to transfer value, enter the value, input an identifier of a second user of a second mobile wallet service, and select an option to initiate the transfer. A transfer request is then generated and transmitted from the mobile device app to systems of the first mobile wallet service provider including the entered data. The first mobile wallet service provider systems will then debit the first user's account, credit a settlement account of the second mobile wallet service provider, and forward the transfer request to the intermediary transfer system, which may be modified to remove an account identifier of the first user and possibly other data and augmented to include a transaction identifier. The transfer intermediary system will then receive and translate the transfer request into an intermediary form and then into a form compatible with the second mobile wallet service provider. The transfer intermediary server may debit a settlement account of the first mobile wallet service provider and credit a settlement account of the second mobile wallet service provider. The translated transfer request is then sent to the second mobile wallet service provider. The second mobile wallet service provider will then credit an account of the second user and debit a settlement account of the first mobile wallet service provider. A message may then be sent to the second user indicating the transfer was received and return a confirmation to the transfer intermediary system. The transfer intermediary system may then relay the confirmation back to the first mobile wallet service provider, which in turn may send a confirmation message to the first user.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100, according to an example embodiment. The system 100 is an example of a simplified system architecture on which some embodiments may be deployed. Various embodiments generally include a greater number of elements, network interconnects and nodes, as well as more mobile devices and other computing devices, as well as more mobile wallet service providers.

The system 100, as illustrated, includes a plurality of mobile devices 102, 104, 110, 112. These mobile devices may be in several different forms, such as smartphones 102, 104, smart watches 112, tablets 110, and other devices. Other devices may include laptop computers, smart controllers within automobiles, handheld computing devices, and others.

The mobile devices 102, 104, 110, 112 are connected to a network 116. The network 116 may be one or more of the Internet, a mobile service provider network, a virtual private network, a wide area network, a local area network, and the like. Further, connections to the network 116 may be wired or wireless.

Also connected to the network 116 are at least two mobile wallet service provider systems 106, 108 and an intermediary transfer system 114. The mobile wallet service provider systems 106, 108 and the intermediary transfer system 114 execute on one or more server computers, which may be physical or virtual computer systems that execute with virtual machines.

Each of the mobile wallet service provider systems 106, 108 include software that communicates with respective mobile wallet service provider apps, websites, and other portals and devices that execute on other devices that users interact with, such as the mobile devices 102, 104, 110, 112. The mobile wallet service provider systems 106, 108 each maintain accounts and value balances for users with accounts within their respective mobile wallet services. The mobile wallet service provider systems 106, 108 also typically have their own respective local interface that allow outside entities, such as the intermediary transfer system 114, to interact therewith via data communications over the network 116. However, in some embodiments, one or more of the mobile wallet service provider system 106, 108 may include an intermediary transfer system 114 interface to locally integrate transfer processes to and from other mobile wallet service providers.

Figure 2:
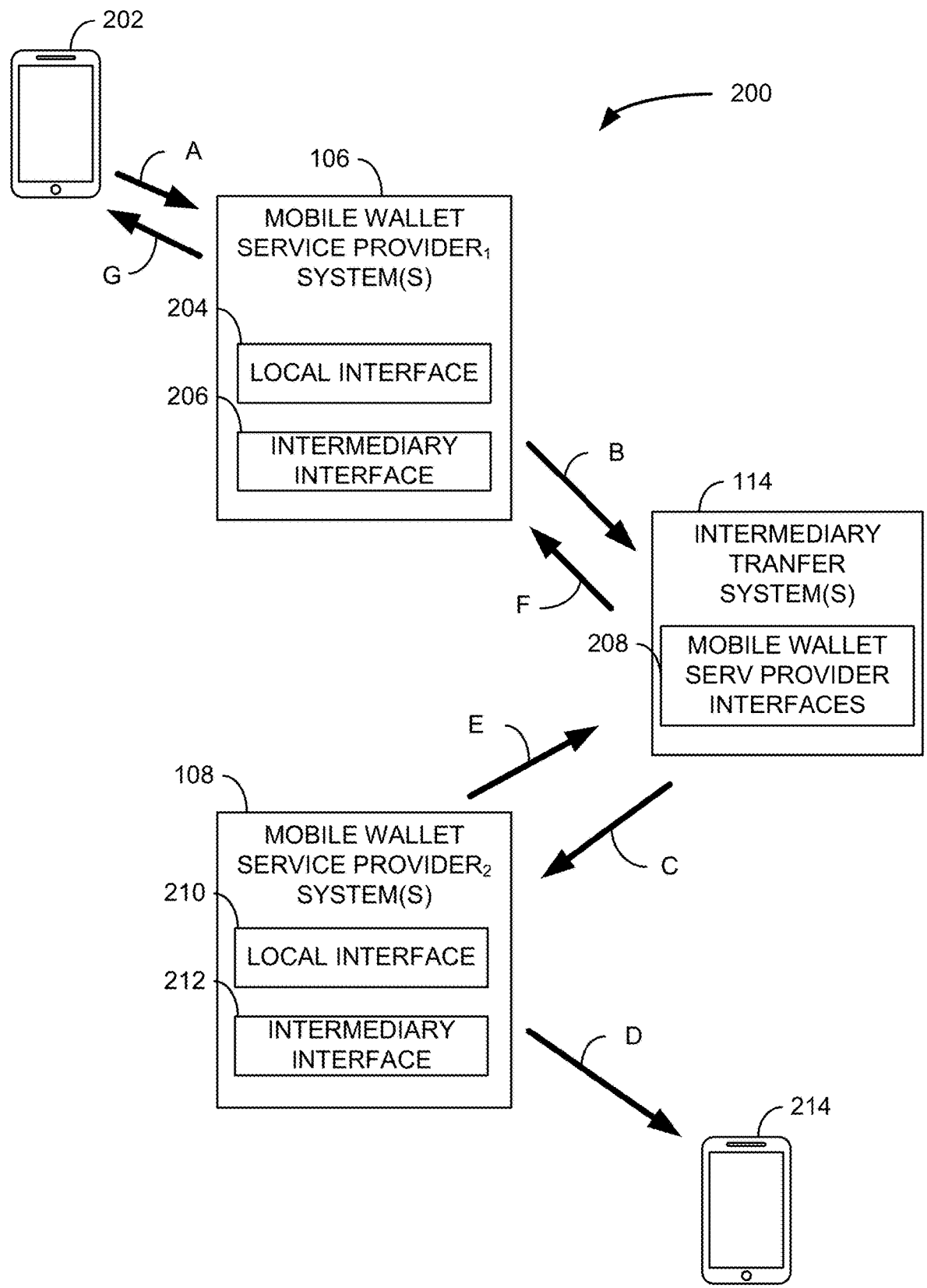
FIG. 2 is a logical block diagram of a system, according to an example embodiment.

The intermediary transfer system 114, in some embodiments, includes interfaces to communicate with each of the mobile wallet service providers 106, 108. For example, such interfaces are utilized to translate data received from or to be sent to between a format of a subject mobile wallet service provider and an intermediary format. Thus, the intermediary transfer system 114, upon receipt of a communication from a first mobile wallet service provider addressed to a second mobile wallet service provider will first translate the communication from a format of the first mobile wallet service provider to an intermediary format using a proper interface of the first provider. Next the intermediary transfer system 114 will translate the communication from the intermediary format to the format of the second mobile wallet service provider using a proper interface of the second provider. The communication may then be sent to the second provider. FIG. 2 is next described with reference to various communications, translations, and other operations according to some embodiments.

FIG. 2 is a logical block diagram of a system 200, according to an example embodiment. The system 200 includes elements from the system 100 of FIG. 1 and is describe with reference to various communications between the entities involved in some embodiments. The lettered arrows A through G represent communications at various points.

Some embodiments begin with a mobile device 202, such as smartphone. A mobile device 202 app of mobile wallet service provider 106 executes on the mobile device 202. A user authenticates within the mobile device 202 app as an authorized holder of an account with the mobile wallet service provider 106. The user of the mobile device 202 app initiates a transfer of value, such currency or points, from the user's mobile wallet service provider 106 account to a mobile wallet service provider 108 user account of mobile device 214. The user of the mobile device 202 enters a value to be transferred within the mobile device 202 app and inputs user or user account identifying data to whom the value is to be transferred. In this case, that user to whom the value is to be transferred is the user of the mobile device 214. The user or user account identifying data may be an account number, a phone number, an email address, or other data that is unique to the target user to whom the value is to be transferred. This may also include data identifying the mobile wallet service provider of the target user.

Once the mobile device 202 app receives this input and an input transfer command, the mobile device 202 app generates and sends a transfer request at A to the mobile wallet service provider 106 system(s). The mobile wallet service provider 106 system receives the transfer request. The mobile wallet service provider 106 systems, in some embodiments, may then process the transfer request to identify whether the transfer is to another account maintained by the mobile wallet service provider 106 or another mobile wallet service provider. In this instance, the mobile wallet service provider determines the transfer request is to an account of the mobile wallet service provider 108. The mobile wallet service provider 106 then is aware that the transfer request is to be forwarded to the mobile wallet service provider 108 via the intermediary transfer system 114. The mobile wallet service provider 106 system then processes the transfer request by performing data processing activities such as debiting the account of the mobile device 202 user, crediting a settlement account of the mobile wallet service provider 108 system, and logging the transfer request, debiting, and crediting. The transaction may be held open until a confirmation is received from the intermediary server indicating the transfer was successfully processed by the mobile wallet service provider 108, at which time the transaction will be committed. Otherwise the transaction may be rolled back when the confirmation is not received or a failure confirmation is instead received. The transfer request may then be transmitted at B to the intermediary server. The transfer request may be transmitted at B in a format of the mobile wallet service provider 106, but in other embodiments, the transfer request may first be processed by an intermediary interface 1206 that formats the transfer request in a format natively compatible with the intermediary transfer system 114.

The intermediary transfer system 114 processes the transfer request upon receipt. This processing may include translating the transfer request from a format of the mobile wallet service provider 106 with a mobile wallet service provider interface 208 of the mobile wallet service provider 106. The mobile wallet service provider interfaces 208 are each interfaces that translate data and commands between formats of an application programming interface exposed by a respective mobile wallet service provider system allowing others to integrate therewith. However, in some embodiments, communications, including transfer requests, may be received in a format native to the intermediary transfer system 114.

The transfer request is then processed further by the intermediary transfer system 114 to log the transfer request, debit a settlement account of the mobile wallet service provider 106 for the value included in the transfer request, and credits a settlement account of the mobile wallet service provider 108 for the value included in the transfer request. The transfer request is then placed in a form compatible with the mobile wallet service provider 108 that will be communicated to a local interface 210 exposed by the mobile wallet service provider 108 to allow integration therewith. However, in some embodiments, the mobile wallet service provider 108 may include an intermediary interface 212 that enables the mobile wallet service provider 108 to process data, including a transfer request, in a data format of the intermediary transfer system 114.

Once the intermediary transfer system 114 has properly formatted the transfer request, the transfer request is transmitted at C to the mobile wallet service provider 108 system(s). The mobile wallet service 108 provider then processes the request by crediting the value to the account of the mobile device 214 user and debits a settlement account of mobile wallet service provider 106. Further data processing activities may also be performed, such as logging receipt of and processing of the transfer request and sending a message at D to the mobile device 214 user indicating the transfer value has been credited and a confirmation message back to the intermediary transfer system 114 at E. In the event that the transfer was not properly processed, rather than sending a confirmation message at E, a failure message is instead sent and any data updates other than log entries, debits, and credits are rolled back.

The intermediary transfer system 114 then receives the message, either confirmation or failure, at E, logs the message, and sends it to the mobile wallet service provider 106 at F. The message first be processed to translate the message to a format compatible with the local interface 204 of the mobile wallet service provider 106 system. In other embodiments, when the mobile wallet service provider 106 includes an intermediary interface 206 enabling processing of communications in a format of the intermediary transfer server 114, no message translation is required.

The mobile wallet service provider 106, upon receipt of the confirmation or failure message at F, processes the message. When the message is a confirmation message indicating the transfer was successful, the open transaction is committed and a confirmation message is transmitted at G to the user of the mobile device 202 user. However, when the message received at F is a failure message, the open transaction is rolled back and a failure message is transmitted at G to the mobile device 202 user.

Figure 3:
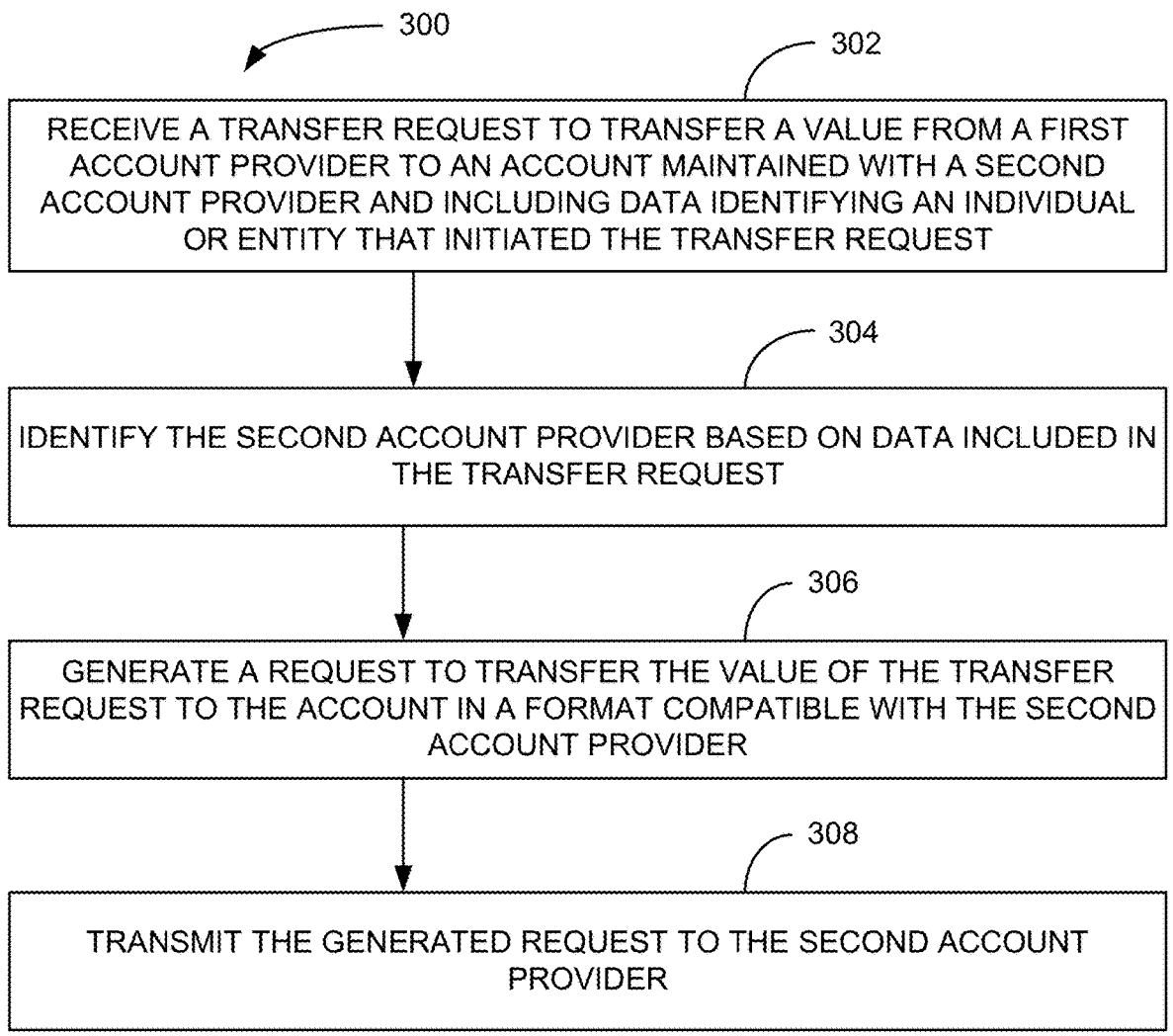
FIG. 3 is a block flow diagram of a method, according to an example embodiment.

FIG. 3 is a block flow diagram of a method 300, according to an example embodiment. The method 300 is an example of a method that may be performed on an intermediary transfer system 114. In some embodiments, the method 300 includes receiving 302 a transfer request to transfer a value from a first account provider to an account maintained with a second account provider and including data identifying an individual or entity that initiated the transfer request. The method 300 further includes identifying 304 the second account provider based on data included in the transfer request and generating 306 a request to transfer the value of the transfer request to the account in a format compatible with the second account provider. The generated request is then transmitted 308 to the second account provider.

Note that the value of the request to transfer may include a currency identifier and a currency amount. In other embodiments, the value of the request to transfer is non-monetary, such as loyalty points, airline miles, or other non-monetary measurement of value.

In some embodiments, the method 300 further includes receiving, from the second account provider, a response to the transmitting of the generated request indicating whether the requested transfer of the value to the account was successful. In some such embodiments, upon receipt of an indication the requested transfer was processed successfully, the method 300 includes crediting a settlement balance of the second account provider in an amount of the value and debiting a settlement balance of the first account provider in an amount of the value.

Some embodiments of the method include writing and storing a log including data representative of received 302 transfer requests, generated and transmitted requests, responses received in response to transmitted requests, and an indication of whether the requested transfer of the value to the account was successful.

In some embodiments, the transfer request is received 302 as data formatted in an intermediary format and the generating 306 of the request to transfer is performed, at least in part, with a second account provider-specific module. The second account provider-specific module may be one account provider-specific module of a plurality of account provider-specific modules. Each account provider-specific module in such embodiments is tailored to enable communication of data in compatible formats with at least one computing system of a respective account provider.

In some embodiments, the transfer request is received 302 as data formatted in a format of the first account provider. Such embodiments may further include translating the data of the first request from the data format of the first account provider to an intermediary format utilizing a first data translation object including methods to translate data between the data format of the first account provider and the intermediary format. In such embodiments, the generating 306 of the request to transfer the value of the transfer request includes translating the request from the intermediate format to the format of the second account provider utilizing a second data translation object that also includes methods to translate data between the intermediary format and the data format of the second account provider.

Figure 4:
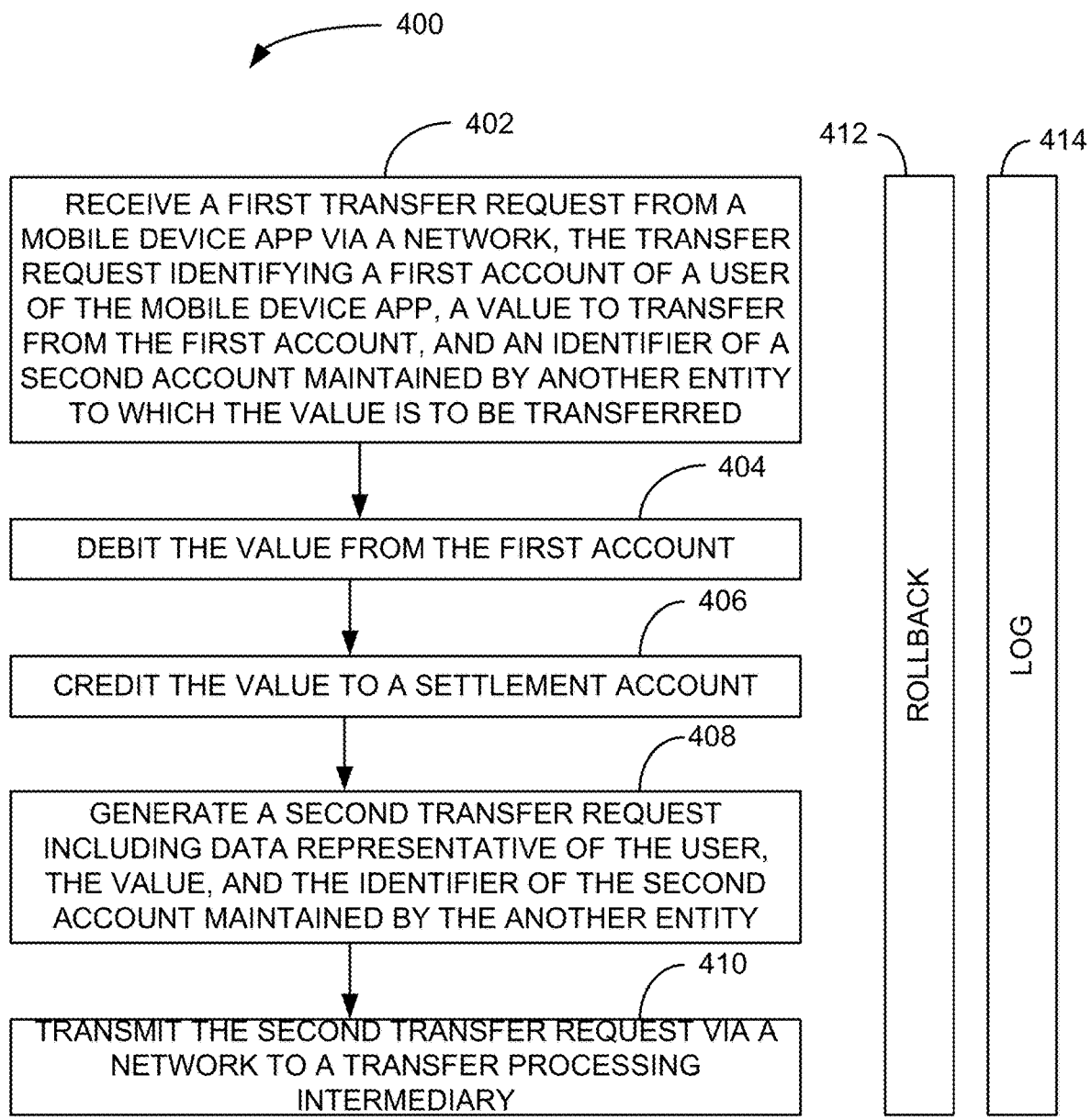
FIG. 4 is a block flow diagram of a method, according to an example embodiment.

FIG. 4 is a block flow diagram of a method 400, according to an example embodiment. The method 400 is an example of a method that may be performed by a mobile wallet service provider 106, 108 upon receipt of a transfer request from an account holder, such as from a mobile device 202, 214 app.

The method 400 includes receiving 402 a first transfer request from a mobile device app via a network. The transfer request may include data identifying a first account of a user of the mobile device app, a value to transfer from the first account, and an identifier of a second account maintained by another entity to which the value is to be transferred. The method 400 further includes debiting 404 the value from the first account and crediting 406 the value to a settlement account. The method 400 may then generate 408 a second transfer request including data representative of the user, the value, and the identifier of the second account maintained by the another entity. The second transfer request is then transmitted 410 via a network to a transfer processing intermediary.

Some embodiments of the method 400 further include receiving a response via the network from the transfer processing intermediary indicating success or failure in processing the second transfer request. Some such embodiments further include rolling back 412 the processing of the first transfer request including rolling back the debiting from the first account and the crediting of the settlement account when the response from the transfer processing intermediary indicates failure in processing the second transfer request. Such embodiments also include committing the processing of the first transfer request including committing the debiting from the first account and the crediting of the settlement account when the response from the transfer processing intermediary indicates success in processing the second transfer request.

Some of these embodiments of the method 400 also include writing and storing, on a data storage device, a log 414 including data representative the received first transfer request, the crediting of the first account, and the debiting of the settlement account. This logging may also include logging the generating and transmitting of the second transfer request and the response received from the transfer processing intermediary indicating success or failure in processing of the second transfer request, and the rolling back or committing of the processing of the first transfer request.

In some embodiments of the method 400, the settlement account is an account within which a cumulative value is maintained to settle value transfers from an entity for which the method is performed to the another entity to which the value is to be transferred.

Figure 5:
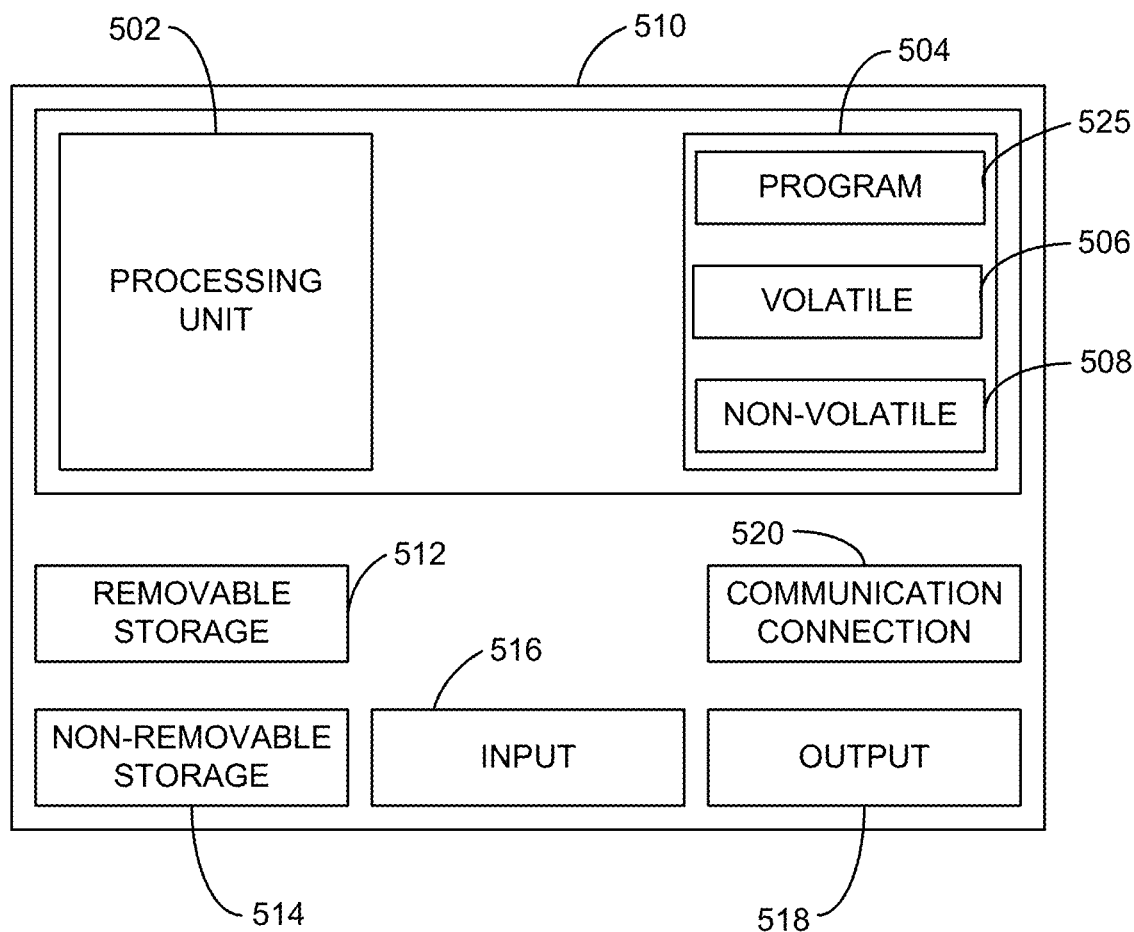
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Although the example computing device is illustrated and described as computer 510, the computing device may be in different forms in different embodiments. For example, the computing device may instead be a smartphone, a tablet, smartwatch, or other computing device including the same or similar elements as illustrated and described with regard to FIG. 5. Devices such as smartphones, tablets, and smartwatches are generally collectively referred to as mobile devices. Further, although the various data storage elements are illustrated as part of the computer 510, the storage may also or alternatively include cloud-based storage accessible via a network, such as the Internet.

Returning to the computer 510, memory 504 may include volatile memory 506 and non-volatile memory 508. Computer 510 may include—or have access to a computing environment that includes a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 510 may include or have access to a computing environment that includes input 516, output 518, and a communication connection 520. The input 516 may include one or more of a touchscreen, touchpad, mouse, keyboard, camera, one or more device-specific buttons, one or more sensors integrated within or coupled via wired or wireless data connections to the computer 510, and other input devices. The computer 510 may operate in a networked environment using a communication connection 520 to connect to one or more remote computers, such as database servers, web servers, and other computing device. An example remote computer may include a personal computer (PC), server, router, network PC, a peer device or other common network node, or the like. The communication connection 520 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 520 may also or alternatively include a transceiver device, such as a BLUETOOTH® device that enables the computer 510 to wirelessly receive data from and transmit data to other BLUETOOTH® devices.

Computer-readable instructions stored on a computer-readable medium are executable by the processing unit 502 of the computer 510. A hard drive (magnetic disk or solid state), CD-ROM, and RAM are some examples of articles including a non-transitory computer-readable medium. For example, various computer programs 525 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving, by executable instructions that are executed by a processor, a first transfer request from a first mobile device wallet app via a local network from a local interface to the first mobile device wallet app, the transfer request identifying a first account of a user of the first mobile device wallet app, a value to transfer from the first account associated with a first account wallet provider of the first mobile device wallet app, and an identifier of a second account maintained by another entity to which the value is to be transferred, wherein the second account maintained by a second account wallet provider of a second mobile device wallet app for the another entity, wherein the first account wallet provide is different from the second account wallet provider;
   debiting, by the executable instructions, the value from the first account;
   crediting, by the executable instructions, the value to a settlement account;
   generating, by the executable instructions, a second transfer request including data representative of the user, the value, and the identifier of the second account maintained by the another entity; and
   transmitting, by the executable instructions, the second transfer request via a wide-area network to a transfer processing intermediary.

2. The method of claim 1, further comprising:
   receiving, by the executable instructions, a response via the wide-area network from the transfer processing intermediary indicating success or failure in processing the second transfer request.

3. The method of claim 2, further comprising:
   rolling back, by the executable instructions, the processing of the first transfer request including rolling back the debiting from the first account and the crediting of the settlement account when the response from the transfer processing intermediary indicates failure in processing the second transfer request; and
   committing, by the executable instructions, the processing of the first transfer request including committing the debiting from the first account and the crediting of the settlement account when the response from the transfer processing intermediary indicates success in processing the second transfer request.

4. The method of claim 3, further comprising:
   writing and storing, by the executable instructions, on a data storage device, a log including data representative the received first transfer request, the crediting of the first account, the debiting of the settlement account, the generating and transmitting of the second transfer request, and the response received from the transfer processing intermediary indicating success or failure in processing of the second transfer request, and the rolling back or committing of the processing of the first transfer request.

5. The method of claim 1, wherein the settlement account is an account within which a cumulative value is maintained to settle value transfers from an entity for which the method is performed to the another entity to which the value is to be transferred.

6. The method of claim 1, wherein the value included in the first transfer request includes a currency identifier and a currency amount.

7. The method of claim 1, wherein the value included in the first transfer request is non-monetary.

8. A system comprising:
at least one network interface device;
at least one processor;
at least one memory device; and
instructions stored in the at least one memory device that are executable by the at least one processor to perform data processing activities comprising:
- receiving, via the at least one network interface device from a transfer intermediary, a transfer request including data identifying a value to be transferred from a first mobile device wallet application associated with a first mobile wallet provider system, an account identifier, and an entity identifier of an entity from which the value to be transferred is to be received, wherein the account identifier is maintained via a second mobile device wallet within a second mobile wallet provider system, wherein the first mobile wallet provider system is different from the second mobile wallet provider system;
- crediting an account of the account identifier with the value;
- debiting a settlement account of the entity of the entity identifier in the amount of the value.

9. The system of claim 8, the data processing activities further comprising:
- generating and transmitting, via the at least one network interface device to the transfer intermediary, a confirmation that the received transfer request has been processed upon successfully crediting the account of the account identifier with the value and debiting the settlement account; and
- when the transfer request has not been processed successfully, rolling back any completed crediting and debiting and generating and transmitting, via the at least one network interface device to the transfer intermediary, a failure to process notification.

10. The system of claim 8, wherein the received transfer request further includes a data item identifying at least one of an originating sender that initiated the transfer request and an account identifier of an account of the originating sender maintained by the entity from which the value to be transferred is to be received.

11. The system of claim 10, the data processing activities further comprising:
- writing and storing, to the at least one memory device, a log including data representative the received transfer request, the crediting of the account of the account identifier with the value, the debiting of the settlement account of the entity of the entity identifier in the amount of the value, the at least one of the originating sender that initiated the transfer request and the account identifier of the account of the originating sender maintained by the entity from which the value to be transferred is to be received, and either the transmitted confirmation or transmitted failure to process notification.

* * * * *